3,317,639
PROCESS FOR PREPARING PHOSPHATE POLYOLS
Robert J. Hartman, Southgate, Mich., assignor to Wyandotte Chemicals Corporation, Wyandotte, Mich., a corporation of Michigan
No Drawing. Filed Sept. 11, 1963, Ser. No. 308,064
9 Claims. (Cl. 260—978)

This invention relates to a process for preparing phosphate polyols and, more particularly, relates to an improved process by which such polyols are prepared by reacting a phosphorus acid with an alkylene oxide at temperatures below about 95° C. As used in the following specification and claims, the term "phosphate polyol" refers to esters of phosphoric and/or polyphosphoric acids containing terminal hydroxyl groups.

It is well known to prepare phosphate polyols by the reaction of phosphorus acids with alkylene oxides. U.S. Patent No. 2,372,244 (1945) discloses a process for the reaction of phosphoric acid with an olefin oxide to obtain such polyols. The patent suggests that the reaction be carried out at temperatures ranging from about $-18$ to 150° C. This reaction is fairly successful for producing phosphoric acid esters from the phosphoric acid of commerce of that period, i.e. 85% phosphoric acid.

Dilute phosphoric acids, i.e. those containing below 100% $H_3PO_4$, are mixtures of phosphoric acid and free water. With reactions employing the dilute acids, the free water reacts with the alkylene oxide to form glycols which are difficult to separate from the phosphate polyol. Thus, in applications requiring relatively pure phosphate polyols free of glycols, a phosphoric acid essentially free of water, i.e. 100% $H_3PO_4$ and stronger, is used to prepare the polyol.

It has been my experience that in the above-described reaction wherein phosphoric acids approaching 100% $H_3PO_4$ and above are used, numerous problems are presented. Whereas with 85% and even 95% phosphoric acid the reaction is exothermic and proceeds smoothly at temperatures of about 60–95° C., the reaction using 100% phosphoric and stronger acids requires heating to temperatures above 95° C. Unfortunately, under the latter conditions, instead of obtaining a water-white product, a brownish-black product, indicating impurities, is obtained. Also, the time required to complete the reaction is markedly increased.

It is an object of this invention to provide an improved process for reacting an alkylene oxide with strong phosphoric acids. Another object of this invention is to provide a method of preparing phosphate polyols at reaction temperatures below 95° C. whereby by-products are minimized. Still further objects are to provide a process for the reaction of strong phosphoric acids with alkylene oxides to obtain clear products with a minimum reaction time.

According to this invention, an acid of phosphorus selected from the group consisting of phosphoric acid, polyphosphoric acids and mixtures of the foregoing is heated at a temperature of from at least 75° C. up to about 200° C. or higher for from about 10 minutes up to several hours or more and then reacted with alkylene oxide. By heating the said phosphorus acid, the subsequent reaction with alkylene oxide is exothermic throughout the addition of the alkylene oxide and the reaction may be carried out at temperatures below 95° C. with gentle cooling. The reaction at these lower temperatures yields clear, water-white phosphate polyols relatively free of by-products. Moreover, the time of addition of alkylene oxide is greatly reduced. I have also observed that heating the acid in the indicated manner serves to make the reaction with the alkylene oxide consistent and reproducible.

I have not been able to determine the exact mechanism by which the heating process serves to enhance the phosphorus acid-alkylene oxide reaction. However, the effect appears to be a function of both time and temperature. Heating for shorter times at higher temperatures is equivalent to heating for prolonged periods of time at a lower temperature. Thus, heating at a temperature of about 75° may require several hours or more to obtain the desired result, whereas by heating the acid at temperatures above 100° C. the same result may be obtained in as little time as 10 minutes. However, at temperatures much above 100° C., corrosion of ferrous equipment is greatly increased and thus such temperatures should preferably be avoided. I prefer to heat the acid at a temperature of about 80–100° C. for from about ½ to 1½ hours. Generally, I have found best results are obtained by heating the acid at temperatures of 90–95° C. for about one hour. It has also been my experience that if the acid, after heating, is allowed to stand for prolonged periods it has a tendency to revert to its original form. Thus, the reaction with the alkylene oxide should be carried out within several days, preferably within about 20 hours after the acid has been heated according to the method of this invention.

The phosphorus acids usable in the process of this invention are those acids corresponding to mixtures of from about 72 to 88% $P_2O_5$ and 28 to 12% water. Included are orthophosphoric acid, pyrophosphoric acid, tripolyphosphoric acid, tetrapolyphosphoric acid, pentapolyphosphoric acid, and higher polyphosphoric acids. The foregoing acids usually exist as an equilibrium mixture containing several species.

The epoxides usable in the process of this invention include, among others, ethylene oxide, propylene oxide, butylene oxides, hexylene oxide, dodecylene oxide, cyclohexane oxide, styrene oxide, halogenated oxides such as epichlorohydrin, 3,3-dichloropropylene oxide, 3,3,3-trichloropropylene oxide, the similar bromine substituted alkylene oxides, and mixtures of any of the foregoing. The process of this invention is particularly applicable to lower alkylene oxides containing from 2 to 4 carbon atoms.

By heating the phosphorus acid as described above, the reaction between the acid and the alkylene oxide may be carried out at temperatures below 95° C. and as low as about 25° C. to obtain clear products essentially free of by-prdoucts such as glycols, isomeric dioxolanes, isomeric dioxanes, etc. Preferably, the reaction is carried out at temperatures of 60–80° C. Pressure is not critical, and the reaction may be carried out at subatmospheric pressures up to about 100 p.s.i.g. or more. Preferably, the reaction is carried out at or slightly above atmospheric pressure.

In general then, the process of this invention comprises heating a phosphorus acid having a $P_2O_5$ equivalency from about 72 to about 88% at an elevated temperature for a suitable time, and reacting the resulting acid with alkylene oxide at a temperature below 95° C. to produce a phosphate polyol. The proportions of the reactants preferably are such that the resulting phosphate polyol is neutral, i.e. that each acid OH group has reacted with alkylene oxide. Thus, at least 1 mol of alkylene oxide is reacted with each OH equivalent of the phosphorus acid, and preferably the reaction is continued so that an average of at least about 2 mols of oxide are reacted per OH equivalent of acid.

The practice of the invention is illustrated by the following examples in which, unless otherwise stated, proportions are expressed as parts by weight.

Example I 400 grams of 100% phosphoric acid corresponding to a mixture of about 72.4% $P_2O_5$ and 27.6% water was charged to a reaction flask equipped with a stirrer, condenser, dropping funnel and thermometer. The acid was heated to 60° C. and 1392 grams of propylene oxide were added in a dropwise manner. Initially, the reaction was slightly exothermic and proceeded smoothly. However, after addition of about 290 grams, the exotherm ceased and heating up to 117° C. was required in order to continue the reaction. The reaction mixture was maintained at near this elevated temperature, and the remaining propylene oxide was added, the total addition time being 24 hours. The mixture was then stripped by heating for 2 hours at 80° C. at 2–4 mm. Hg pressure. 1619 grams of a brownish-black liquid product was obtained, representing a 90.5% yield based on total reactants. The dark color is indicative of impurities in the product.

Example II 98 grams of 100% phosphoric acid was charged to a reaction flask as in Example I and heated at 90° C. with stirring for 1 hour. The acid was then cooled to 60° C. and 348 grams of propylene oxide were added dropwise. The addition of the oxide was carried out over a 5-hour period, during which time an exothermic reaction proceeded smoothly at 60–70°. The mixture was then stripped by heating for 2 hours at 83–84° at 8–10 mm. Hg pressure. 434 grams of a clear, water-white product were obtained. This represents a 98% yield based on total reactants. Comparing the results of this example with that of Example I shows that by heating 100% phosphoric acid for 1 hour at 90° C. prior to reaction with alkylene oxide results in a smooth exothermic reaction over the total reaction period yielding a clear, uncontaminated product. Moreover, the time required for addition of the propylene oxide is markedly reduced.

Example III 50 grams of 85% phosphoric acid were mixed with 143 grams of 105% phosphoric acid. The resulting acid is equivalent to 100% phosphoric acid. With stirring, the mixture was heated to 91–98° C. for 1 hour and then cooled to 60° C. 697 grams of propylene oxide was then added to the acid over a period of 10 hours. An exothermic reaction proceeds smoothly at a temperature of 60–83° C. The mixture was stripped of volatiles by heating at 82–83° for 2 hours at 1–3 mm. Hg pressure. 830 grams of a clear, water-white product representing a 93% yield were obtained.

Example IV 98 grams of 95% phosphoric acid were charged to a 500 ml. reaction flask equipped with a stirrer, condenser, dropping funnel and thermometer. The charge was heated to 90–95° C. for 1 hour and then cooled to 60°. 380 grams of propylene oxide were then added to the flask and the reaction was carried out for approximately 5 hours at 65–70° C. The mixture was then stripped at 80° C., 1 mm. Hg pressure for 2 hours under nitrogen atmosphere. 435.4 grams of a clear, water-white product comprising a mixture of the desired phosphate polyol and propylene glycol were obtained.

The above procedure was repeated with the exception that the phosphoric acid was not heated to 90–95° C. for the 1-hour period, i.e. 98 grams of phosphoric acid were added to the reaction flask and 380 grams of propylene oxide were added at a temperature of 65–70° C. over a period of 5 hours. After stripping in the usual manner, 437 grams of a clear, water-white product comprising a mixture of the desired polyol and propylene glycol were obtained. The above runs show that with 95% phosphoric acid the preheating of the phosphoric acid is neither required nor does it have any significant effect on the subsequent reaction with alkylene oxide.

Example V

This run was carried out to investigate the reaction of 105% phosphoric acid with alkylene oxide. 196 grams of commercial 105% phosphoric acid were charged to the reaction vessel. The mixture was heated to 47° C. and propylene oxide was added in a dropwise manner. Initially, a smooth, exothermic reaction occurred but after the addition of 125 grams of oxide the reaction ceased. The mixture required heating and maintenance at 103–120° C. in order for the reaction mixture to continue propylene oxide uptake.

Example VI 588 grams of 105% commercial phosphoric acid were charged to a reaction flask and heated to 90–95° C. for 1 hour with stirring. The mixture was then cooled to 60° C. and 2092 grams of propylene oxide were added over a 13-hour period. The smooth, exothermic reaction was carried out at 60–73° C. The product was then stripped by heating for 2 hours at 80° C. at about 1 mm. Hg pressure. 2448 grams of a clear, water-white product were obtained, representing a 90% yield.

Example VII 49 grams of 100% phosphoric acid was charged to a reaction flask and heated at 90° to 95° C. for 1 hour with stirring, then cooled to 60° C. Ethylene oxide (222 grams) was added dropwise with stirring over a period of 3.2 hours while the temperature of the reaction was maintained at 65° to 70° C. After the addition was completed, the reaction mixture was heated at reflux (45° C.) for 2 hours. The product was then stripped of volatiles by heating at 80° C., 1 mm. Hg pressure for 2 hours under a nitrogen atmosphere. The product, clear and water white, weighed 243.2 grams.

Example VIII

Into a reaction flask was added 294 grams of 100% phosphoric acid. The acid was heated at 90° to 95° C. for 1 hour with stirring, then cooled to 60° C. 1,2-butylene oxide (1,328 grams) was added dropwise over an 8-hour period while the temperature of the reaction mixture was maintained at 60° to 70° C. The reaction mixture was then heated at 70° C. for 1 hour and stripped of volatiles by heating at 80° C., 1 mm. Hg pressure for 2 hours under a nitrogen atmosphere. The desired product weighed 1,376 grams.

Example IX 98 grams of 100% phosphoric acid was heated at 90° to 95° C. for 1 hour, then cooled to 60° C. 555 grams of epichlorohydrin was added dropwise to the acid over a 4.3-hour period. During the addition, the reaction temperature was maintained at 65° to 70° C. After 2 more hours of heating at 70° C., the reaction mixture was stripped of volatiles by heating at 80° C., 1 mm. Hg pressure for 2 hours under a nitrogen atmosphere. A clear product weighing 547 grams was obtained.

Example X 98 grams of 100% phosphoric acid was charged to a reaction flask and heated to 90° C. to 95° C. for 1 hour, then cooled to 60° C. Dodecene oxide (1106 grams) was added dropwise at 60° to 70° C. over a 4-hour period. After the oxide addition the reaction mixture was heated at 70° C. for 1 hour. The product was stripped by heating at 130° to 135° C., 1 mm. Hg pressure for 2 hours under a nitrogen atmosphere. A product weighing 937 grams was obtained.

Good results are also obtained with other highly concentrated phosphorus acids. Thus, the invention contemplates the use of orthophosphoric acid, pyrophosphoric acid, tripolyphosphoric acid, and higher polyphosphoric acids and mixtures of the foregoing, and in general phosphorus acids corresponding to mixtures of from about 72 to 88% $P_2O_5$ and 28 to 12% water.

Another advantage of my process is that the phosphorus acid-alkylene oxide reaction is predictable and reproducible. It has been my experience that in using the prior art process product quality and yield varied with each run. Using the method of this invention solves these problems as is shown by the following example.

*Example XI*

A series of reactions between 100% phosphoric acid and propylene oxide were carried out at various temperatures. The technique was the same throughout: 392 grams of phosphoric acid were added to 1627 grams of propylene oxide in one-gallon autoclave. The addition was carried out over a 5-hour period and the reaction mixture was then heated at 70° C. for an additional 2 hours. The product was then stripped by heating for about 2 hours at 80° to 85° C., under 2–8 mm. Hg. pressure. In all cases, a neutral product having an acid number less than about 0.4 was obtained. To determine the effect of preheating the acid, with one group of reactions the phosphoric acid was heated at 90° to 95° C. for 1 hour prior to reaction with the propylene oxide. With the second group, the acid was not heated according to the method of this invention, but was added directly to the propylene oxide. The compositions of the products obtained from the various runs are shown in Table 1.

TABLE 1.—$H_3PO_4$-PROPYLENE OXIDE ADDUCTS

| Approximate Reaction T., ° C. | Run No. | $H_3PO_4$ Heated to 90°–95° C. Prior to Reaction | Composition, Value of X in $H_3PO_4(X\ PO)^1$ |
|---|---|---|---|
| 40 | 1 | Yes | 5.82 |
|    | 2 | Yes | 5.89 |
| 60 | 3 | Yes | 5.65 |
|    | 4 | Yes | 5.67 |
| 70 | 5 | No  | 4.86 |
|    | 6 | No  | 5.84 |
|    | 7 | No  | 5.50 |
|    | 8 | Yes | 5.46 |
|    | 9 | Yes | 5.35 |
| 85 | 10 | No  | 5.30 |
|    | 11 | No  | 4.78 |

$^1$ PO = propylene oxide.

As clearly evidenced by the data of Example XI, preheating the phosphoric acid according to the method of this invention served to stabilize the reaction with propylene oxide to yield a reproducible product at a given temperature. In contrast, when carrying out the reaction without preheating the acid, inconsistent products were obtained with widely varying compositions.

As previously noted, the mechanism by which the heating of the acid serves to enhance the phosphorus acid-alkylene oxide reaction has not been determined. However, differential thermal analyses (DTA) were carried out on normal 100% phosphoric acid, and on such acid heated according to the method of this invention. The DTA procedure involves slowly heating a sample of a material and observing the temperature at which any sharp increase or decrease in temperature occurs, indicating an exotherm or endotherm. While DTA data do not establish chemical structure they are very useful in showing a difference in structure of various compounds or mixtures of compounds.

In carrying out the DTA procedure, ten drops of standard 100% phosphoric acid was added to the cavity of a dual-cavity block equipped with rupture discs. To the reference cell, 3 grams of powdered columbium metal was added. Thermocouples were sealed in the cavities using Teflon tape as gasketing material. The block was then placed in a heater with thermocouple leads wired to the recorders so as to record the temperature differential between the cavities. The block was heated at a constant rate of 5°±1° C. per minute to a temperature of 250° C. and the change in temperature of the sample cell and the temperature of the block was recorded. The procedure was repeated using 100% phosphoric acid which had been heated at 90°–95° C. for 1 hour.

In each instance, a sharp temperature increase occurred which indicated that an exothermic reaction took place. The temperature at which the exotherm occurred varied with the treatment of the acid prior to the DTA determination. The results of DTA studies on 100% phosphoric acid were as follows:

TABLE 2

| Run No. | Treatment of Phosphoric Acid Prior to DTA | Temperature of Exotherm, ° C. |
|---|---|---|
| 1 | Room temperature equilibrium | 181 |
| 2 | Heated at 90° to 95° C. for 1 hour | 191 |
| 3 | Heated at 90° to 95° C. for 1 hour, then allowed to stand at room temperature for 5 hours. | 190 |
| 4 | Heated at 90° to 95° C. for 1 hour, then allowed to stand at room temperature overnight for about 20 hours. | 181 |

The above study indicates that heating the phosphoric acid according to the method of this invention changes its chemical composition to yield a material that requires a significantly higher temperature to show an exotherm. Moreover, if the heated acid is allowed to stand for prolonged periods, it has a tendency to revert to its original state.

The phosphate polyols prepared by the process of this invention are useful as intermediates in the synthesis of polyurethane foams, especially of the fire resistant type, for plasticizers for vinyl-type resins and for use in functional fluids.

I claim:

1. A process for producing phosphate polyols comprising heating an acid of phosphorus selected from the group consisting of phosphoric acid, polyphosphoric acids, and mixtures of such acids, said acid of phosphorus corresponding to a mixture of from about 72–88% $P_2O_5$ and 28–12% by weight water, at a temperature of from about 75–200° C. for a period of from about 10 minutes to about 2 hours, and reacting the thus obtained acid product with an epoxide at a temperature below about 95° C.

2. The process of claim 1 wherein said phosphorus acid is heated to a temperature of 80–100° C. for a period of from about ½ to 1½ hours.

3. The process of claim 2 wherein reaction of said phosphorus acid with epoxide is carried out at a temperature of 60–80° C.

4. The process of claim 1 wherein said acid is 100% phosphoric acid and said heating is carried out at 90–95° C. for about 1 hour.

5. The process of claim 4 wherein said epoxide is propylene oxide.

6. The process of claim 1 wherein at least 1 mol of said epoxide is reacted with each OH equivalent of said phosphorus acid.

7. The process of claim 1 wherein a sufficient amount of epoxide is reacted with said phosphoric acid to obtain an essentially neutral product.

8. A process for preparing phosphate polyols comprising heating an acid of phosphorus selected from the group consisting of phosphorus acids which correspond to a mixture of from about 72 to 88% $P_2O_5$ and 28 to 12% by weight water at a temperature of from about 80–100° C. for 0.5 to 1.5 hours, reacting the thus obtained acid product with a vicinal alkylene oxide containing 2 to 4 carbon atoms at a temperature below about 95° C. and recovering the phosphate polyol product.

9. A process for preparing a phosphate polyol having an average of 2 oxypropylene groups per acid OH group which comprises heating essentially 100% phosphoric acid at a temperature of 90–95° C. for about 1 hour and reacting 1 mol of said product with about 6 mol propylene oxide at a temperature of 60–80° C.

References Cited by the Examiner

UNITED STATES PATENTS

| | | | |
|---|---|---|---|
| 2,372,244 | 3/1945 | Adams et al. | 260—978 X |
| 3,094,549 | 6/1963 | Gurgiolo et al. | 260—978 |
| 3,099,676 | 7/1963 | Lanham | 260—978 X |

OTHER REFERENCES

Van Wazer, "Phosphorus and Its Compounds," vol. 1, Interscience Publishers, Inc., New York, N.Y. (1958), page 484.

CHARLES B. PARKER, *Primary Examiner.*

FRANK M. SIKORA, ANTON H. SUTTO,
*Assistant Examiners.*